Dec. 3, 1929.　　　　C. O. FARNHAM　　　　1,737,753
HOISTING APPARATUS
Filed Aug. 20, 1927　　　　2 Sheets-Sheet 1
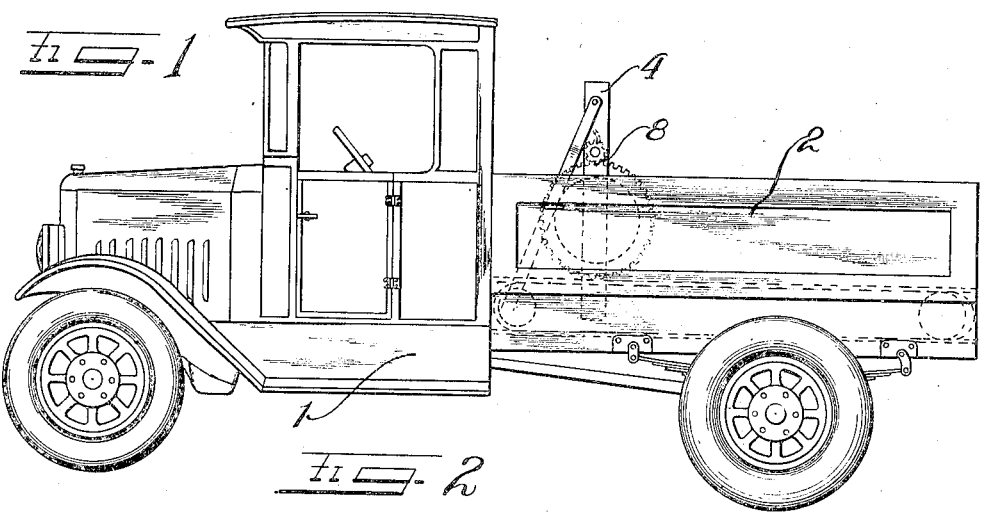
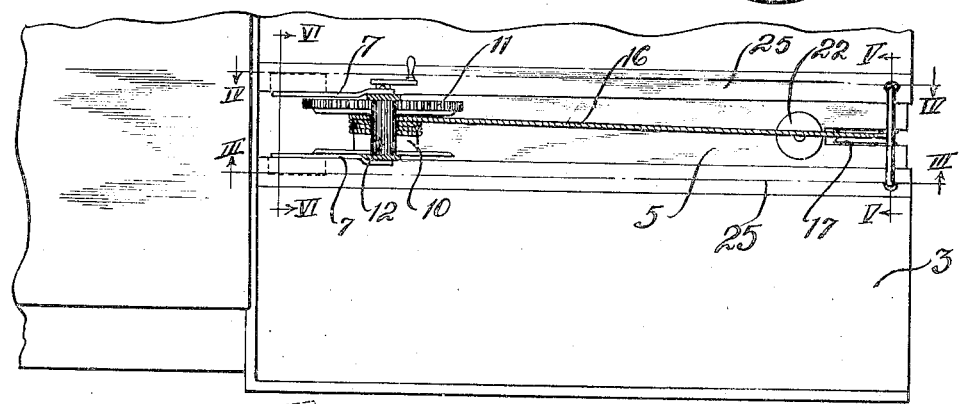
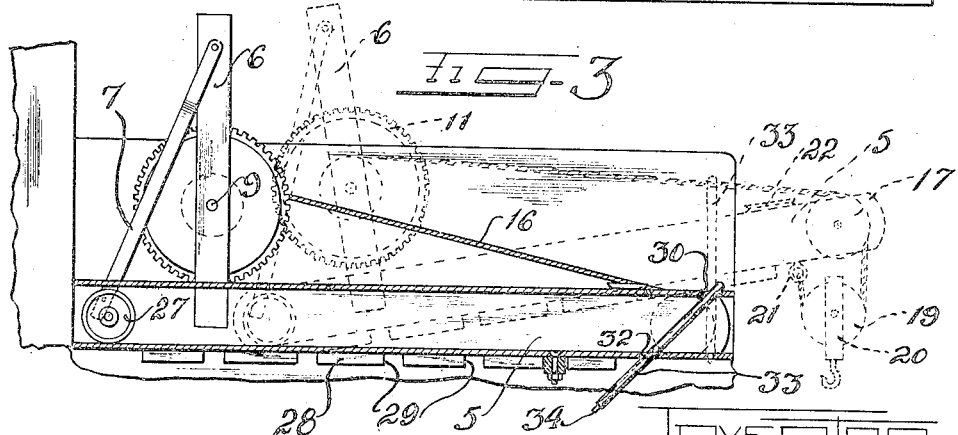
INVENTOR
Carl. O. Farnham
by Charles H. Hill
Attys Dec. 3, 1929.  C. O. FARNHAM  1,737,753
HOISTING APPARATUS
Filed Aug. 20, 1927   2 Sheets-Sheet 2
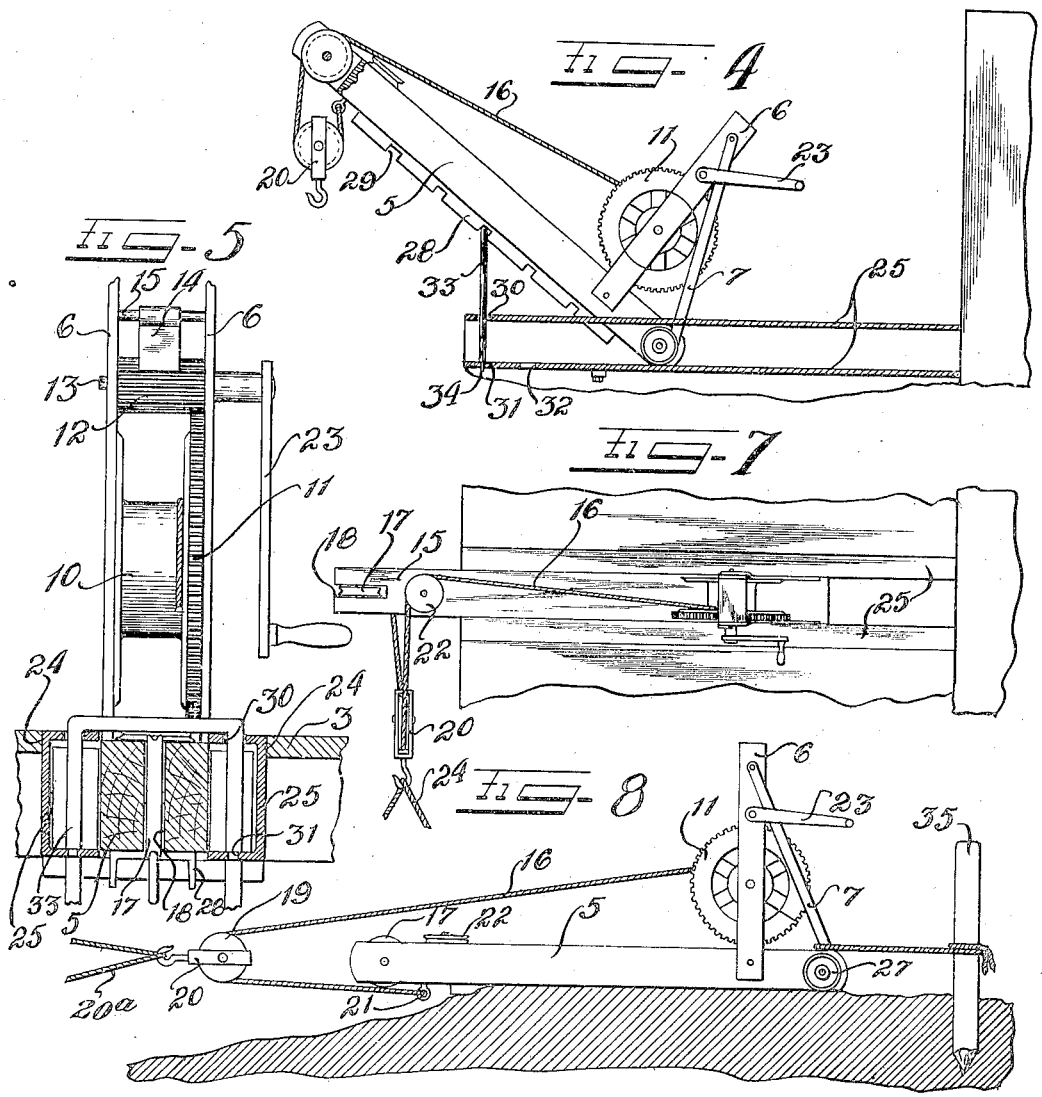
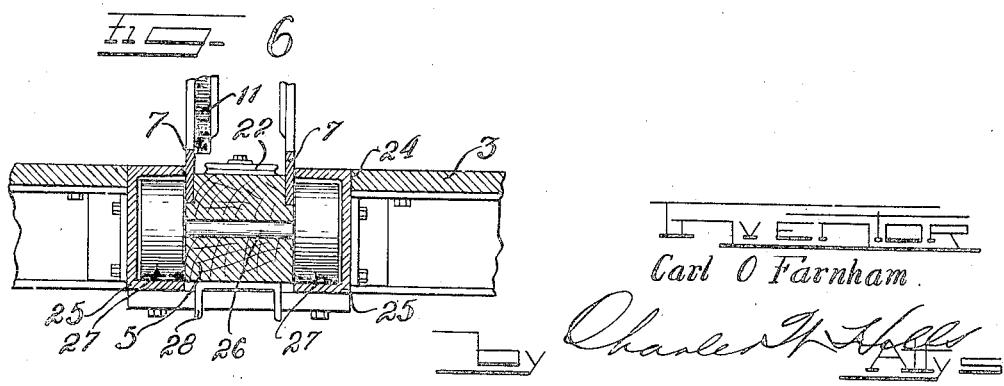
INVENTOR
Carl O Farnham Patented Dec. 3, 1929

1,737,753

UNITED STATES PATENT OFFICE

CARL O. FARNHAM, OF PARIS, ILLINOIS; FIRST NATIONAL BANK & TRUST COMPANY, OF PARIS, ILLINOIS, ADMINISTRATOR OF SAID CARL O. FARNHAM, DECEASED

HOISTING APPARATUS

Application filed August 20, 1927. Serial No. 214,277.

This invention relates to improvements in hoisting apparatus and the like for any of its uses and purposes, and more particularly to hoisting apparatus for use in conjunction with a vehicle. The invention relates more especially to hoists or derricks, including a winch, boom, and ball and chain tackle, of the type used on trucks, cars and the like for moving wrecked or ditched vehicles as well as for the accomplishment of many other obvious purposes.

In the past, hoists of this character have been more or less cumbersome and occupied a more than desirable amount of space in the body of a truck or the like. In addition, they were not adapted for many and varied adjustments, and permitted a machine being towed with one end elevated to sway, and to materially lessen the distance between the truck and towed machine to an extent that frequently became dangerous to the truck driver as well as to both machines. Moreover most of the hoists of the prior art were not readily and easily removable from a truck or the like, nor could they be used for straight or angular pulls in a horizontal direction.

This invention is designed to overcome the above noted defects and objections in the provision of a hoist adapted to be operated in the body of a vehicle or separately therefrom, and which is portable and easily manipulated.

The invention also seeks to provide a hoist of the class described having a boom which can be readily adjusted to various heights, whereby an end of a vehicle or the like, may be elevated and retained in close proximity to the end of the boom, and side sway or the possibility of coasting of a towed vehicle are reduced to a minimum.

Another important object of this invention is to provide a hoist which occupies very little floor space in the vehicle in which it is mounted, whereby said vehicle may be used to transport other articles, and the loading or unloading of these articles will not be impeded by the hoist.

Still another important object of this invention is to provide a hoist of the class described which is adjustable to exert a pull upon objects not substantially in the plane of the boom.

A still further important object of this invention is to provide a hoist or the like of the class described which may easily and quickly be removed from a vehicle, and which is susceptible of being anchored to a tree, post or the like, for moving objects.

While some of the more salient features and characteristics of a machine embodying this invention have been above pointed out others will become apparent from the following disclosures.

The invention includes these and other features of construction and combinations of parts hereinafter described and shown in a preferred form in the drawings, as more particularly indicated by the claims.

On the drawings:

Figure 1 is a view in elevation of a motor truck showing a device embodying principles of the present invention mounted therein.

Figure 2 is a fragmentary plan view of a portion of the truck and device of Figure 1.

Figure 3 is a fragmentary vertical sectional view taken substantially along line III—III of Figure 2.

Figure 4 is a fragmentary sectional view in elevation taken substantially along line IV—IV of Figure 2 and showing the device in a different position.

Figure 5 is a fragmentary sectional view in elevation taken substantially along line V—V of Figure 2.

Figure 6 is a fragmentary vertical sectional view with parts in elevation taken substantially along line VI—VI of Figure 2.

Figure 7 is a fragmentary plan view similar to Figure 2 showing a different function of the device.

Figure 8 is a view in elevation of the device itself showing the same in operative position when not associated with the motor truck.

As shown in the drawings:

In the illustrated embodiment of this invention there is shown a truck, designated generally by the reference numeral 1, with a truck body 2 mounted thereon having a floor or platform 3 therein. The truck which is of the type commonly known as a "wrecker", is equipped with a hoist or derrick 4 embodying new and novel elements and construction to be hereinafter described.

The hoist 4 comprises in general a base member or beam 5, which, as will later appear herein, is adapted to act as a boom for the hoist, a frame comprising a pair of upright members 6 and a pair of oblique members 7 secured to the beam 5, and a winch 8 carried by the members 6 which are supported by the members 7.

The winch 8 comprises a shaft 9 journaled in the members 6, on which shaft is mounted a drum 10. Adjacent or integral with the drum 10 is a relatively large spur gear 11 and meshing with said gear 11 is a pinion 12 mounted on a shaft 13 also journaled in the members 6 (Figure 5). Above the pinion 12 a pawl 14 is freely and loosely mounted on a fixed shaft 15 and is adapted to prevent backward rotation of the pinion and drum.

A cable 16, which may be rope or chain but which is preferably a wire cable, having one end secured to the drum 10 normally passes over a pulley or sheave 17, which is rotatably mounted on a short shaft in a slot 18 in the outer end of the beam 5 (Figures 5 and 7). The cable 16 also passes over a pulley or sheave 19 in a ball-and-chain tackle 20 and is secured to an eye-bolt 21 or other desirable means on the under side of the beam 5. A third pulley or sheave 22 which the cable 16 is adapted to engage in certain instances, is rotatably mounted in a transverse position on the upper side of the beam 5 for a purpose to be hereafter set forth.

On one end of the shaft 13 a handle 23 is provided which is manually operated to actuate the gear 11 and drum 10 to wind up the cable 16 and draw the ball-and-chain tackle 20, thereby exerting a pull upon an exterior object (not shown) which may be temporarily attached to the tackle 20 as indicated by the rope 20ª or similar means. Obviously if so desired, the winch may be operated by power means without departing from the spirit of this invention.

Novel means are provided for mounting the hoist 4 within the body 2 of the truck 1. It is to be noted that the platform 3 of the truck body 2 has a slot or recess 24 running substantially the entire length thereof. Secured at each side of the slot 24 in any manner is a channel iron 25 which channel irons have their horizontal faces projecting inwardly toward each other to thereby form substantially a track. A shaft 26 is mounted in the beam 5 adjacent one end thereof, and a pair of substantially wide tread rollers or wheels 27 are rotatably mounted on this shaft. The wheels 27 are adapted to ride between the horizontal portions of the channel irons 25, whereby the wheels are substantially embraced by the channel irons on three surfaces. When these wheels are in their innermost position (Figures 1 and 2) the beam 5 which pivots upon the shaft 26, is folded down within the space between the channel irons and forms substantially an integral part of the truck platform 3. The wheels also provide free and easy means for moving the entire hoist 4 along the platform 3 or entirely removing it therefrom.

As shown in Figures 3 and 4, by elevating the beam 5 slightly, the hoist may be moved along the track formed by the irons 25 to assume any desired position therealong. To the under side of the beam 5 a channel iron 28 is secured which is provided in the sides thereof with aligned notches 29. The channel irons 25 are provided adjacent their outer ends with aligned apertures 30 and 31 in their upper and lower sides respectively and with additional apertures 32 in their lower sides and spaced inwardly from the apertures 31 for the accommodation of an inverted U-bar 33. It is to be noted that the apertures 30 and 32 are relatively large and the U-bar 33 will pass therethrough quite readily. The projecting extremities of the U-bar are provided with tips 34 of reduced diameter and adapted to fit within the apertures 31 whereby the U-bar may be securely mounted in a vertical position (Figure 4) and the shoulders adjacent the tips 34 will maintain the bar in this position. This U-bar 33 is adapted to engage within any pair of notches 29 to thereby support the beam 5 with its outer end in elevated position and to maintain the same in this position against slipping. Obviously, therefore, the beam 5 may be elevated to substantially any desirable angle and when so elevated functions as a boom for the hoist 4. The frame members 6 and 7, of course, are mortised to the beam 5 so as to permit such elevation of the beam. When the beam is flush with the platform 3 or folded into the groove between the channel irons 25, the U-bar is inserted in the apertures 30 and 32 in oblique position over the top of the beam as shown by the full line in Figure 3.

The operation is as follows:

Assuming it is desired to merely tow an article behind the truck 1, the beam 5 is elevated as shown by the dotted lines in Figure 3, and the U-bar 33 is inserted through the apertures 30 and 32 as shown by the full lines in Figure 3. The U-bar will, therefore, engage the inner shoulder of the most rearward notch 29 and will thereby compensate for the reaction to the pull exerted upon the article to be towed which is secured to the tackle 20.

Assuming it is desired to tow a vehicle or the like with one end in elevated position, the outer end of the beam 5 is elevated as previously described, to the desired height, and the winch is operated to elevate the end of the vehicle to be towed. Due to the adjustable boom 5, the towed vehicle may be secured in close proximity to the tackle 20 which tackle may be elevated into close proximity with the sheave 17. The towed vehicle and the hoist are thereby joined into almost an integral unit, and due to the short space between the end of the boom 5 and elevated end of the towed vehicle, the latter is prevented from coasting into the truck 1, and undue side sway of the rear vehicle is eliminated. During the elevation of the one end of the towed vehicle, the U-bar 33 although sustaining a great portion of the weight upon the tackle 20, acts as a pivot point for the boom 5, and the wheels 27 abutting the upper horizontal portions of the channel irons 25, take up the remainder of the weight.

Assuming now that it is desired to move a vehicle or other article in a direction oblique or at right angles to the truck 1, the cable 16 is disengaged from the sheave 17 and engaged around the transversely disposed sheave 22 as shown in Figure 7. The boom, of course, may be elevated to any desired height and the winch operated in the customary manner, and the object attached to the tackle 20 will be moved obliquely or transversely to the truck 1.

Assuming now it is desired to move a vehicle or other object which is disposed in a place unsafe or unfit for the truck 1, the U-bar 33 is removed and the hoist entirely removed from the truck body by merely running it rearwardly until the wheels 27 leave the track formed by the channel irons 25. This operation is readily and easily accomplished and the hoist being light in weight and easily portable, is transported to the immediate vicinity of the object to be moved, set up upon the ground and anchored to a post, tree, or the like, 35 as shown in Figure 8. When in this position the boom acts as a base for the frame and winch mechanism, and the hoist may be used to move the object either by a straight-forward or angular pull, as previously described, utilizing the winch in conjunction with sheave or not, as desired, until the object is in sufficient proximity to the truck 1. The hoist is then remounted in the truck body by placing the wheels 27 within the channel irons 25 and running them therealong, after which the movement of the object is continued in the manner hereinbefore described.

It is to be noted as clearly shown in Figure 1, that the hoist hereinabove described occupies very little floor space within the truck body 2, the beam or boom 5 being substantially a part of the floor 3. The truck, therefore, may be used to transport other articles which may be loaded and unloaded without impedance by the hoist 4.

It is to be noted further that many and varied uses of the present invention, other than those set forth hereinabove, will occur to one skilled in the art, and it is to be expressly understood that such uses will fall within the spirit of this invention which is not to be construed as limited to the uses set forth hereinabove.

From the foregoing it is apparent that I have provided a hoist adapted for installation in a vehicle, which functions either in or out of the vehicle, which is adjustable, and which is simply constructed and may be economically manufactured.

I am aware that many changes may be made and numerous details of construction may be varied through a wide range without departing from the principles of this invention and I, therefore, do not purpose limiting the patent granted hereon otherwise than necessitated by the prior art.

I claim as my invention:

1. In combination, a platform having a slot therein, channel irons lining said slot to form substantially a track, a hoist including a beam, a winch mounted on said beam, and rollers mounted on said beam and adapted to ride said channel irons, said beam being pivotal into said slot so that the top of said beam will be substantially flush with said platform.

2. In combination with a platform having a slot therein, channel irons lining opposite sides of said slot, a hoist including a boom, rollers on said boom ridable in said channel irons, and means associated with said irons and said boom for maintaining an end of the latter at a predetermined height.

3. In combination, a vehicle platform having a slot therein, channel irons lining opposite sides of said slot, a hoist removably mountable in said slot, a boom associated with said hoist. wheels on said boom ridable in said channel irons, a notched member secured to the underside of said boom, and means associated with said channel irons for selectively engaging notches in said member for adjusting said boom.

4. In combination, a vehicle platform having an internal track therein, and a hoist mountable in said platform, said hoist including a boom, means on said boom ridable in said track, a member having a series of notches therein secured to the underside of said boom, and a support engageable with said track and said notches for adjusting said boom.

5. In combination. a truck floor having a longitudinal recess therein, means in said recess to form a track therein, and a hoist including a boom, and means mounted on said boom adjacent an end thereof for riding said track, said boom being pivotal on said means into said recess so as to be flush with the upper surface of said floor.

6. In combination, a truck floor having a slot therein, a boom normally lying within said slot flush with said floor, a winch adjacent the inner end of said boom, a sheave adjacent the outer end of said boom engageable by a cable from said winch, means for adjustably retaining the inner end of said boom within said slot, and means for supporting the outer end of said boom in any desired degree of elevation.

7. In combination, a truck having a recess in the floor thereof, and a hoist mountable in said truck, said hoist including a boom foldable into said recess, and a winch on the inner portion of said boom, whereby when said boom is folded said winch will occupy a position adjacent the cab of said truck leaving the remainder free for transporting articles.

8. In combination, a truck floor having a slot therein, and hoisting means removably mountable on said floor, said means including a boom, means on said boom for engagement in said slot so that said boom may enter said slot to form substantially a part of said floor, and winch mechanism associated with said boom.

9. In combination, a truck body having a slot in the floor thereof, and a hoist mountable in said body, said hoist including a boom adapted to lie in said slot flush with said floor, hoisting mechanism associated with said boom, and means for maintaining said boom in longitudinal or elevational positions of adjustment relative to said floor.

In testimony whereof I have hereunto subscribed my name at Paris, Edgar County, Illinois.

CARL O. FARNHAM.